(12) United States Patent
Dabbs et al.

(10) Patent No.: US 8,818,632 B2
(45) Date of Patent: Aug. 26, 2014

(54) DETECTION OF UNCOMMANDED MOTION OF A STEERING MOTOR

(75) Inventors: Harold Dabbs, Peoria, IL (US); Brittany J. Lee, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 36 days.

(21) Appl. No.: 13/436,152

(22) Filed: Mar. 30, 2012

(65) Prior Publication Data

US 2013/0261895 A1 Oct. 3, 2013

(51) Int. Cl.
*A01B 69/00* (2006.01)
*B62D 6/00* (2006.01)
*B62D 11/00* (2006.01)

(52) U.S. Cl.
USPC ............................. 701/41; 180/6.2; 180/248

(58) Field of Classification Search
USPC ........ 701/24, 31.4, 32.7, 41, 42, 89; 180/242, 180/415, 418, 422, 446, 6.2, 197, 443, 248; 318/432, 489, 663
See application file for complete search history.

(56) References Cited

U.S. PATENT DOCUMENTS

| 4,956,590 | A  | * | 9/1990  | Phillips ....................... 318/432 |
| 6,208,922 | B1 | * | 3/2001  | Easton ........................... 701/41 |
| 7,658,234 | B2 |   | 2/2010  | Brandt et al. |
| 7,942,220 | B2 |   | 5/2011  | Dabbs et al. |
| 2008/0093152 | A1 |   | 4/2008 | Gray |
| 2009/0133951 | A1 |   | 5/2009 | Schultz et al. |
| 2011/0010050 | A1 | * | 1/2011 | Suzuki et al. .................. 701/41 |
| 2011/0282551 | A1 | * | 11/2011 | Sasaki et al. ................... 701/42 |

* cited by examiner

*Primary Examiner* — Tuan C. To
*Assistant Examiner* — Isaac Smith
(74) *Attorney, Agent, or Firm* — Miller, Matthias & Hull

(57) ABSTRACT

In a machine having a differential steering control system, uncommanded motion may be determined by comparing an actual speed of a steering motor to a commanded turn direction signal from an operator. Where uncommanded motion is occurring, the steering motor speed and time-rate-of-change of the steering motor speed may be used to determine a weighted steering motor speed that is accumulated over a series of sample cycles and compared to an integration limit to determine whether the operator should be warned of the occurrence of uncommanded motion. The integration limit may be based on a factor indicative of the responsiveness of the machine, such as the oil temperature.

20 Claims, 7 Drawing Sheets

DETECTION OF UNCOMMANDED MOTION OF A STEERING MOTOR

TECHNICAL FIELD

This invention relates generally to a differential steering control system for a machine and, more particularly, to a steering control system for detecting uncommanded motion of the machine and alerting an operator of the machine of the occurrence of the uncommanded motion.

BACKGROUND

Hydro-mechanical differential steering systems are employed in large track-type tractors or machines to provide smooth, equal, and uninterrupted power and torque flow to both the left and the right tracks at all times when the tractor is moving. It is also important to provide power to the tracks whenever the tractor is turning in either the left or right directions. A hydro-mechanical differential steering system is typically powered by a mechanical input and a hydraulic input. The mechanical input is provided from the transmission and the hydraulic input is received from an engine driven variable displacement pump. Other types of differential steering systems are also employed in track-type tractors and similar machines where steering is executed by differential motion of steering elements such as tracks and wheels.

In conventional machines, such as a track-laying type of machine, turning control is performed by an operator steering lever or other type of control mechanism. Even when under the control of the operator, the track-type tractor can have instances where uncommanded steering or other motion can occur. For example, the track-type tractor may move forward in a straight line when the operator tries to turn the machine. In other situations, the track-type tractor may turn where no turn is commanded by the operator, or may turn in the opposite direction that that commanded by the operator. The latter turn anomalies may be particularly problematic due to the risks of hitting workers or structures near the track-type tractor, or driving the track-type tractor over surfaces or terrain that may cause instability of the machine. Moreover, the uncommanded motion may be more problematic when the machine is operating at higher speeds where the operator has less time to react to and correct the uncommanded motion.

Control systems for hydrostatically driven equipment are known in the art. For example, U.S. Pat. Appl. Publ. No.2009/0133951, entitled "Method for Operating a Hydrostatically Driven Vehicle," teaches a hydrostatically driven vehicle, such as an asphalt compactor, has an engine operating a variable displacement propel pump, a displacement of which can vary based on an angle of a rotating swashplate, such that a fluid flow impelled by the pump transfers power to at least one propel motor rotating a wheel of the vehicle. An electronic controller of the vehicle senses an operating parameter of the system, for example, the angle of the rotating swashplate or the direction and speed of rotation of the propel motor with a sensor to yield an actual signal, and relays the actual signal to an electronic controller. The controller determines a desired angle for the rotating swashplate based on the control signal, and compares it to the actual signal from the sensor. Motion of the vehicle is stalled when the angle signal differs from the desired angle by a predetermined extent and for a predetermined period. The control disclosed in the publication relates only to the actual speed of the vehicle and not to uncommanded turning motion as can be found in track-type tractors. Additionally, the predetermine period of time for evaluating the difference between the actual angle of the swashplate is different from the commanded angle appears to be the same regardless of the commanded speed of the vehicle.

In another example, U.S. Pat. Appl. Publ. No. 2008/0093152, entitled "Hydraulic Hybrid Vehicle Method of Safe Operation, teaches a hydraulic hybrid vehicle includes elements such as a hydraulic pump driven by an internal combustion engine and arranged to draw in low pressure fluid and pump the fluid at high pressure to an accumulator. A hydraulic motor is powered by the pressurized fluid. Safety processes are provided for detecting and addressing a number of conditions that may arise in the operation of the hydraulic hybrid vehicle, including an initialization procedure for start-up of the vehicle, a shut-down procedure, and procedures for detecting and responding to failure of the pump or motor, internal and external fluid leaks, and non-responsive actuation and mode control systems. One process monitors the motor displacement and compares a commanded motor displacement to an actual motor displacement. If the difference between the displacements is above a predetermined threshold value, the commanded motor displacement is set to zero. If the difference is still greater than the threshold value, it is determined that a condition similar to a throttle sticking is occurring and a mode valve is commanded to a neutral position and an auto-shutdown may be performed. The duration of the difference between the commanded and the actual motor displacements is not evaluated in the process, and the auto-shutdown may occur on the first instance of detecting the difference in the motor displacements.

In some prior implementations where a steering motor is used, for example, to cause a track-type tractor to turn by creating differential speed between the tracks, steering motor speed feedback is used to detect uncommanded motion occurring when the actual steering motor speed is above a commanded steering motor speed by a threshold speed for a specified amount of time. Once the threshold speed is exceeded for the prescribed time period, the brakes are engaged to stop the tractor. Using a fixed speed threshold and specified duration of uncommanded motion for all speeds of the tractor creates problems in tuning the uncommanded motion limiting system. If the speed threshold is lowered and/or the duration limit is shortened to react quickly to uncommanded motion at high tractor speeds, the number of false trips, and corresponding work delays, are increased. If the speed threshold is raised and/or the duration is lengthened, the false trips at low speeds will be reduced, but the delay in stopping the tractor for uncommanded motion at high speeds reduces the amount of time and distance available to stop the tractor and avoid an accident. If the thresholds are set to strike a balance between high speed and low speed operations, the system is not optimized for either condition and will still result in some false trips at very low speeds and some excess uncommanded motion at very high speeds.

The type of system described above also fails to account for operating conditions internal and external to the vehicle that affect the vehicle's ability to respond to uncommanded motion. For example, the temperature of oil affects the oil's viscosity. The oil is more viscous at lower temperatures, and the vehicle systems are generally less responsive or sluggish when the oil temperature is low. As the temperature increases, such as when the running engine is transferring heat to the lubricating oil, the viscosity of the oil decreases and the vehicle systems become more responsive to operator commands and react more quickly to the commands to steer the machine. By using a speed threshold and a specified duration for determining when excess uncommanded motion is occurring, an uncommanded motion limiting system wholly ignores any affects of the internal and external conditions affecting vehicle response.

In view of the above, a need exists for a system for detecting uncommanded motion of a steering motor and alerting an operator of the vehicle that may take into account and base its responsiveness on the steering motor speed and the cumulative effect of the uncommanded motion over a number of samplings, the effect of internal and external factors affecting the speed of reaction of the vehicle to correct or eliminate uncommanded motion, as well as other factors.

SUMMARY OF THE INVENTION

In one aspect of the present disclosure, the invention is directed to a differential steering control system for a machine where differential motion is created to steer the machine. The system may include a transmission for moving the machine in a forwards or a backwards direction, a steering motor for steering the machine in a leftwards or a rightwards direction, a steering device for providing turn direction signals indicating a desired direction of motion to cause the machine to move on a commanded path of motion, and a control unit operatively connected to the transmission, the steering motor, and the steering device. The control unit may be programmed to receive the turn direction signals from the steering device and to output steering motor speed command signals to cause the steering motor to operate at a commanded steering motor speed to move the machine along the commanded path of motion. The control unit may also be programmed to determine an actual steering motor speed of the steering motor, to compare the actual steering motor speed to the commanded steering motor speed, and to determine a weighted steering motor speed in response to determining that the actual steering motor speed is not equal to the commanded steering motor speed, wherein the weighted steering motor speed is based on the actual steering motor speed. The control unit may further be programmed to add the weighted steering motor speed to a cumulative integration value for uncommanded motion, to compare the cumulative integration value to an integration limit for uncommanded motion of the machine, and to execute an uncommanded motion response strategy in response to determining that the cumulative integration value is greater than the integration limit.

In another aspect of the present disclosure, the invention is directed to a method for detecting and responding to uncommanded motion in a machine where differential motion is created to steer the machine. The method may include commanding the machine to move along a commanded path of motion, determining an actual path of motion of the machine, and comparing the actual path of motion to the commanded path of motion. The method may also include determining a weighted amount of uncommanded motion of the machine in response to determining that the actual path of motion is not equal to the commanded path of motion, wherein the weighted amount of uncommanded motion is based on an actual steering motor speed of a steering motor of the machine, adding the weighted amount of uncommanded motion to a cumulative integration value for uncommanded motion, comparing the cumulative integration value to an integration limit for uncommanded motion of the machine, and executing an uncommanded motion response strategy in response to determining that the cumulative integration value is greater than the integration limit.

In a further aspect of the present disclosure, the invention is directed to a differential steering control system for a machine where differential motion is created to steer the machine. The system may include a transmission for moving the machine in a forwards or a backwards direction, a steering motor for steering the machine in a leftwards or a rightwards direction, a steering device for providing turn direction signals indicating a desired direction of motion to cause the machine to move on a commanded path of motion, and a control unit operatively connected to the transmission, the steering motor, and the steering device. The control unit may be programmed to receive the turn direction signals from the steering device and to output steering motor speed command signals to cause the steering motor to operate at a commanded steering motor speed to move the machine along the commanded steering motor speed of the steering motor, to determine an actual steering motor speed, and to compare the actual steering motor speed to the commanded steering motor speed. The control unit may also be programmed to determine a cumulative integration value for uncommanded motion in response to determining that the actual steering motor speed is not equal to the commanded steering motor speed, wherein the cumulative integration value is based on the actual steering motor speed, to determine an integration limit for uncommanded motion based on a value of a parameter indicative of an ability of the machine to produce the commanded motion, to compare the cumulative integration value to the integration limit, and to execute an uncommanded motion response strategy in response to determining that the cumulative integration value is greater than the integration limit.

In a still further aspect of the present disclosure, the invention is directed to a method for detecting and responding to uncommanded motion in a machine where differential motion is created to steer the machine. The method may include commanding the machine to move along a commanded path of motion, determining an actual path of motion of the machine, and comparing the actual path of motion to the commanded path of motion. The method may further include determining a cumulative integration value for uncommanded motion in response to determining that the actual path of motion is not equal to the commanded path of motion, wherein the cumulative integration value is based on a difference between an actual steering motor speed of a steering motor of the machine, determining an integration limit for uncommanded motion of the machine, wherein the integration limit is based on a value of a parameter indicative of an ability of the machine to respond to uncommanded motion, comparing the cumulative integration value to the integration limit, and executing an uncommanded motion response strategy in response to determining that the cumulative integration value is greater than the integration limit.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated and constitute a part of this specification, illustrate exemplary embodiments of the invention and, together with the description, serve to explain the principles of the invention. In the drawings.

DETAILED DESCRIPTION

Although the following text sets forth a detailed description of numerous different embodiments of the invention, it should be understood that the legal scope of the invention is defined by the words of the claims. The detailed description is to be construed as exemplary only and does not describe every possible embodiment of the invention. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
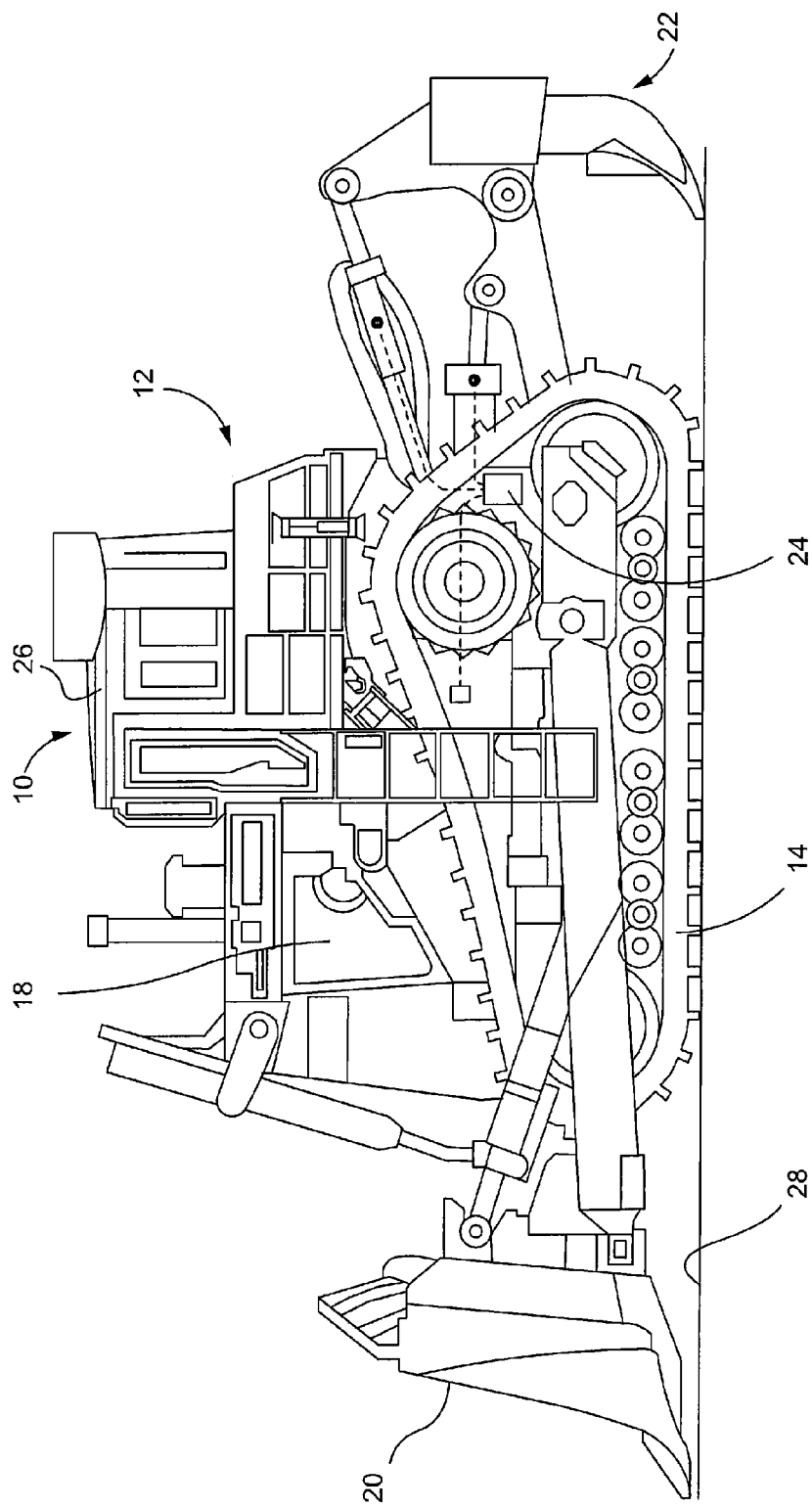
FIG. 1 is a diagrammatic side view of a track-type tractor in which uncommanded motion detection in accordance with the present disclosure may be implemented.

Referring to FIG. 1, a track-type tractor 10 may include a chassis 12, a pair of movable tracks 14, 16 (not shown) powered by an engine 18, and ground engaging implements in the form of a blade 20 and a ripper 22. The tractor 10 may further include an electronic control unit 24 receiving commands from implement and steering controls (not shown) in an operator station 26 of the tractor 10. As the operator manipulates to the controls, the electronic control unit 24 in response controls the engine 18 to drive the tractor 10 over a surface 28, and operably controls actuators that can change the elevation and orientation of the blade 20 and the ripper 22 to perform the necessary excavation of the work material. The track-type tractor 10 is used herein for purpose of illustration, but the uncommanded motion control strategies in accordance with the present disclosure may be implemented in any other type of vehicle where uncommanded motion may be undesirable, or other drive mechanism where differential motion is created to steer a tractor, machine or other vehicle. Consequently, "tractor," "machine," "vehicle" or other similar terms may be used to generically refer to equipment in which uncommanded motion may be present and controlled.

Figure 2:
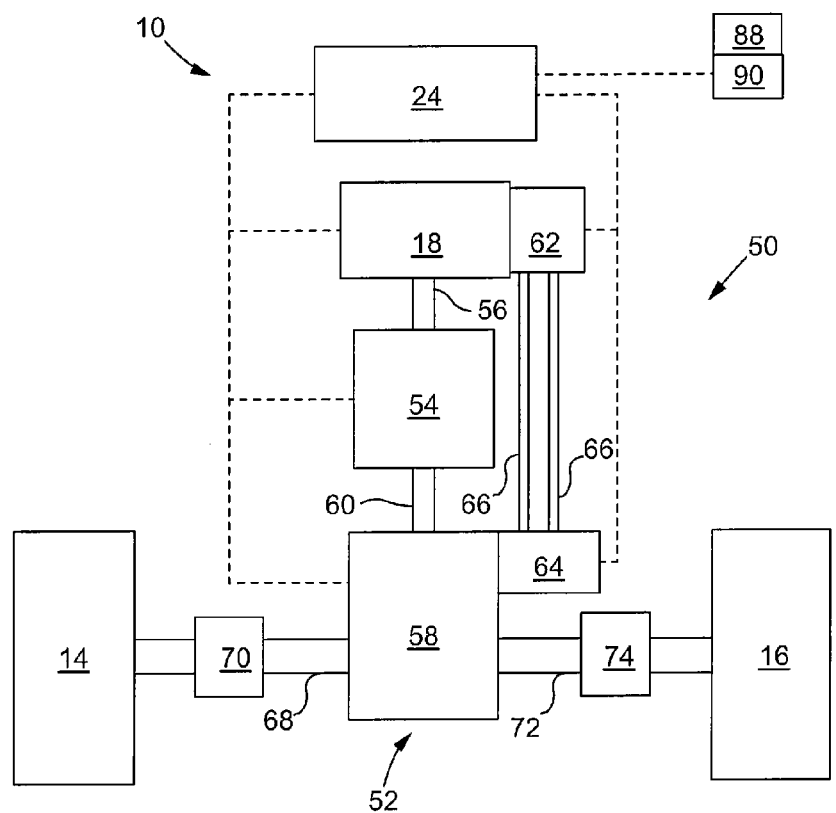
FIG. 2 is a schematic view of a machine-level differential steering control system of the track-type tractor of FIG. 1.

FIG. 2 illustrates a steering control system 50 that may be incorporated within the track-type tractor 10 or other type of machine for providing differential steering to the left track 14 and the right track 16 of the tractor 10 through a drive train 52. Though tracks 14, 16 are illustrated herein as driving the tractor 10 over the surface 28, those skilled in the art will understand that differential steering may be provided by other types of drive components, such as wheels and tires, and the implementation of the control system 50 in vehicles driven by such components is contemplated by the inventors. The drive train 52 includes the engine 18 and a transmission 54 connected to the engine 18 through a drive shaft 56. In the embodiment of FIG. 2, the transmission 54 is illustrated as a continuously variable hydro-mechanical transmission. The transmission 54 is connected to a steering differential 58 through a shaft 60 to provide a mechanical input thereto. A pump 62 provides hydraulic input to a steering motor 64 through fluid lines 66 to drive the steering differential 58. The pump 62 may be a reversible, variable displacement type and driven by the engine 18 through a suitable drive connection (not shown).

Figure 3:
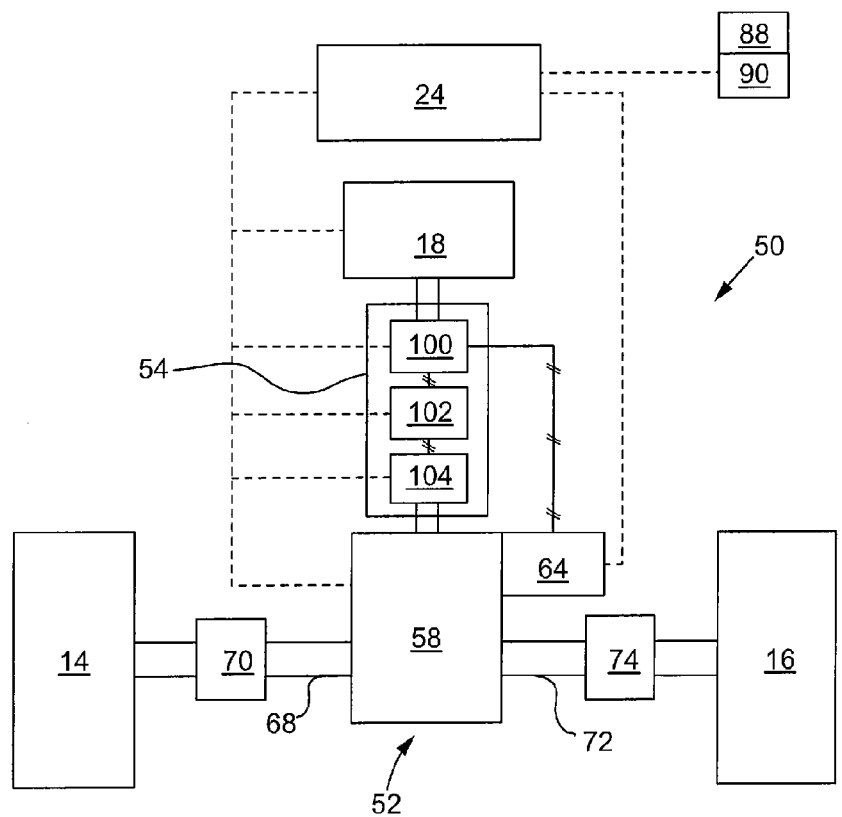
FIG. 3 is a schematic view of another embodiment of a machine-level differential steering control system of the track-type tractor of FIG. 1 having an electrical drive train.

In alternative embodiments, the transmission 54 may be hydro-mechanical, electro-mechanical, or purely electric, including a generator and motor. For example, FIG. 3 illustrates a transmission 54 embodied as an electric drive train. The electric drive train includes a generator 100, power electronics 102, and an electric motor 104. The electric motor 104 provides propulsion to move the machine 10. In this particular embodiment, the electric motor 104 receives power from the generator 100 or the power electronics 102. The steering motor 64 may also be electric and receive power from the generator 100. The use of hydro-dynamic and electric-driven continuously variable transmissions in the examples set forth herein is illustrative only. Control systems in accordance with the present disclosure may also be implemented with any appropriate type of transmission including, for example, power shift transmissions that are not continuously variable.

Referring to FIGS. 2 and 3 jointly, the steering differential 58 drives the left traction device 14 through a left axle shaft 68, which is coupled to a left final drive 70. The steering differential 58 drives the right traction device 16 through a right axle shaft 72, which is coupled to a right final drive 74. Movement of the machine 10 may be in either the forward or reverse direction and the machine 10 may also be placed in neutral. The machine 10 may be maneuvered to move or turn in either the left or right directions when a relative velocity exists between the left traction device 14 and the right traction device 16. The electronic control unit 24 monitors and controls the direction and speed of the machine 10 through the transmission 54 and the steering motor 64. The control unit 24 may be electrically connected to the engine 18, the transmission 54, the pump 62, and the steering motor 64, as well as additional sensors 76, 78 (see FIG. 4) for determining speeds, directions, errors, temperatures, and the like.

Figure 4:
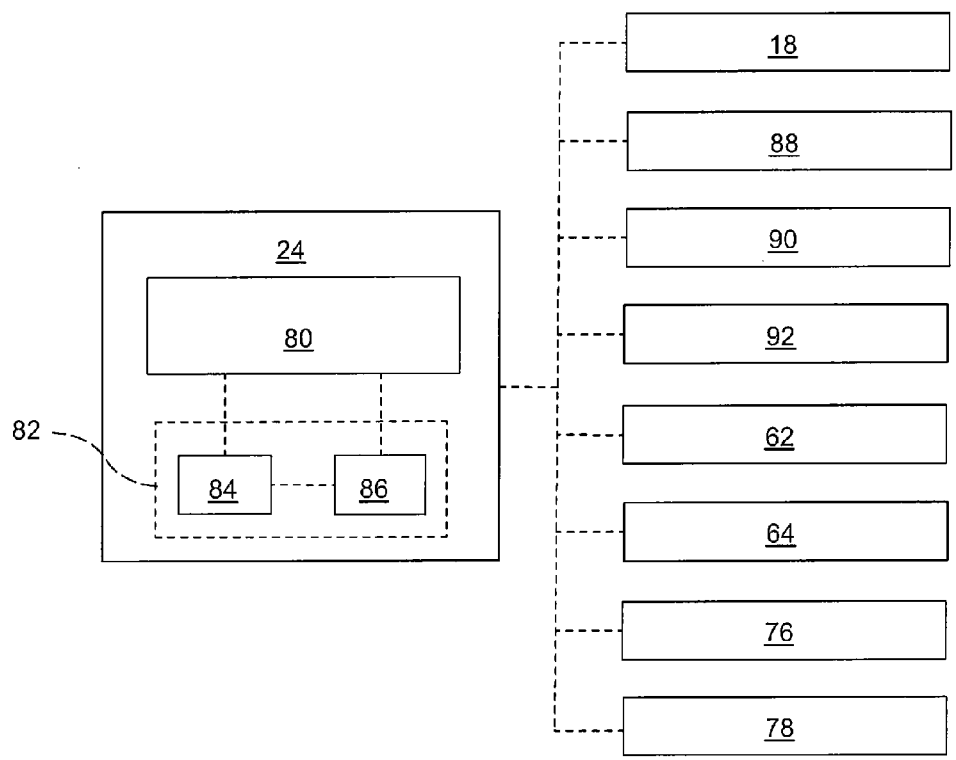
FIG. 4 is a schematic view of electrical components of the track-type tractor of FIG. 1.

Referring now to FIG. 4, the control unit 24 may include a microprocessor 80 for executing a specified program, which controls and monitors various functions associated with the machine 10. The microprocessor 80 includes a memory 82, such as ROM (read only memory) 84, for storing a program, and a RAM (random access memory) 86 which serves as a working memory area for use in executing the program stored in the memory 82. Although the microprocessor 80 is shown, it is also possible and contemplated to use other electronic components such as a microcontroller, an ASIC (application specific integrated circuit) chip, or any other integrated circuit device. The control unit 24 electrically connects to the engine 18, a steering device 88, a direction selector 90, a steering motor speed sensor 92, the pump 62, the steering motor 64, axle speed sensors 76 that may be placed on the left or right traction devices 14, 16, or on the left or right axle shafts 68, 72, and an oil temperature sensor 78. The steering device 88 may be a wheel, joystick, push/pull bar, pedals, or the like in the operator station 26. The direction selector 90 may be a Forward-Neutral-Reverse ("FNR") device, or the like, and provides desired directional information to the control unit 24. The steering motor speed sensor 92 provides information indicative of the output of the steering motor 64 to the steering differential 58 to cause a differential speed between the left and the right axle shafts 68, 72.

Figure 5:
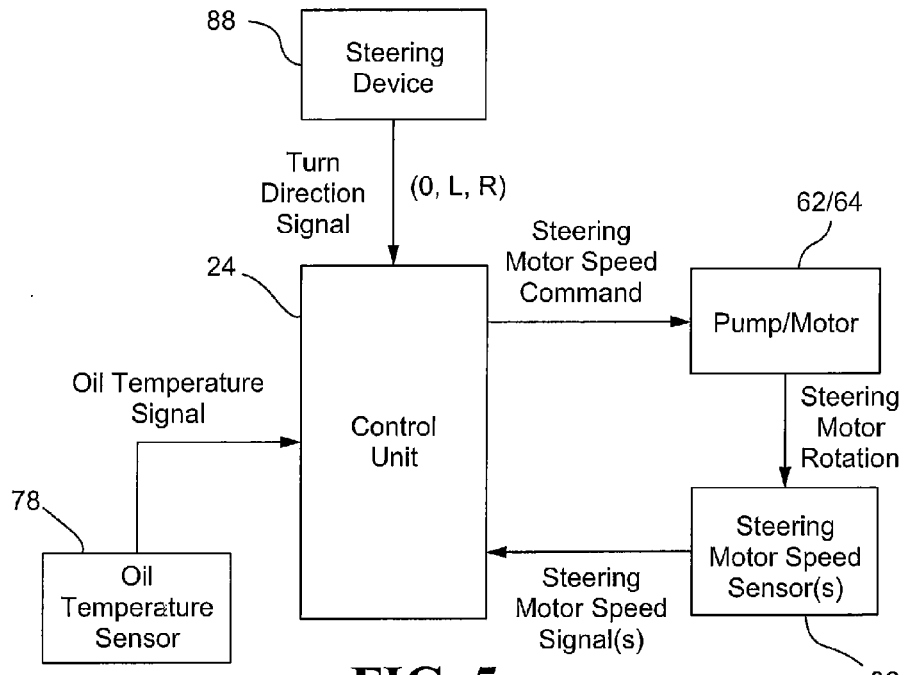
FIG. 5 is a system level diagram illustrating a flow of control signals and sensor inputs for a steering control system in accordance with the present disclosure of the track-type tractor of FIG. 1 as shown in FIG. 2.
Figure 6:
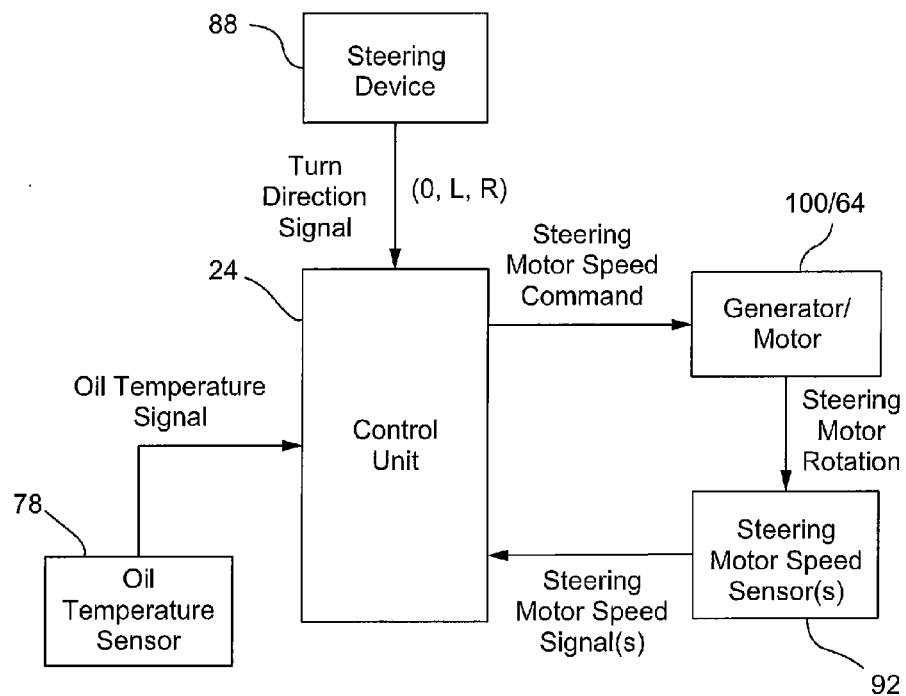
FIG. 6 is a system level diagram illustrating a flow of control signals and sensor inputs for a steering control system in accordance with the present disclosure of the track-type tractor of FIG. 1 as shown in FIG. 3.

In operation, the transmission 54 provides propulsive power to the traction devices 14, 16. FIG. 5 is a system level diagram illustrating the flow of control signals and sensor inputs for the steering control system 50 shown in FIG. 2. The steering device 88 provides a turn direction signal to the control unit 24 indicative of an operator's desire to turn to the left or to the right at a desired turn radius, or to drive the tractor 10 straight. In response to the turn direction signal, the control unit 24 outputs steering motor speed command signals commanding an up-stroking or a de-stroking of the pump 62 to increase or decrease the speed of the steering motor 64 based on the value of the turn direction signal if a turn is indicated. Alternatively, as shown in FIG. 6, the control unit 24 may command additional power supply from the generator 100 of FIG. 3 to increase the speed of the steering motor 64 if it is an electric motor. The steering motor 64 either increases or decreases a rotational speed of either of the left or right axle shafts 68, 72 to create a relative speed there between when the operator commands a turn. In effect, the left or right final drives 70, 74 increase or decrease to create a relative speed between the two to effect a turning action. The steering motor speed sensor 92 may sense the speed of the steering motor 64 or the rotational speeds of the axle shafts 68, 72 and transmit steering motor speed signals to the control unit 24.

Figure 7:
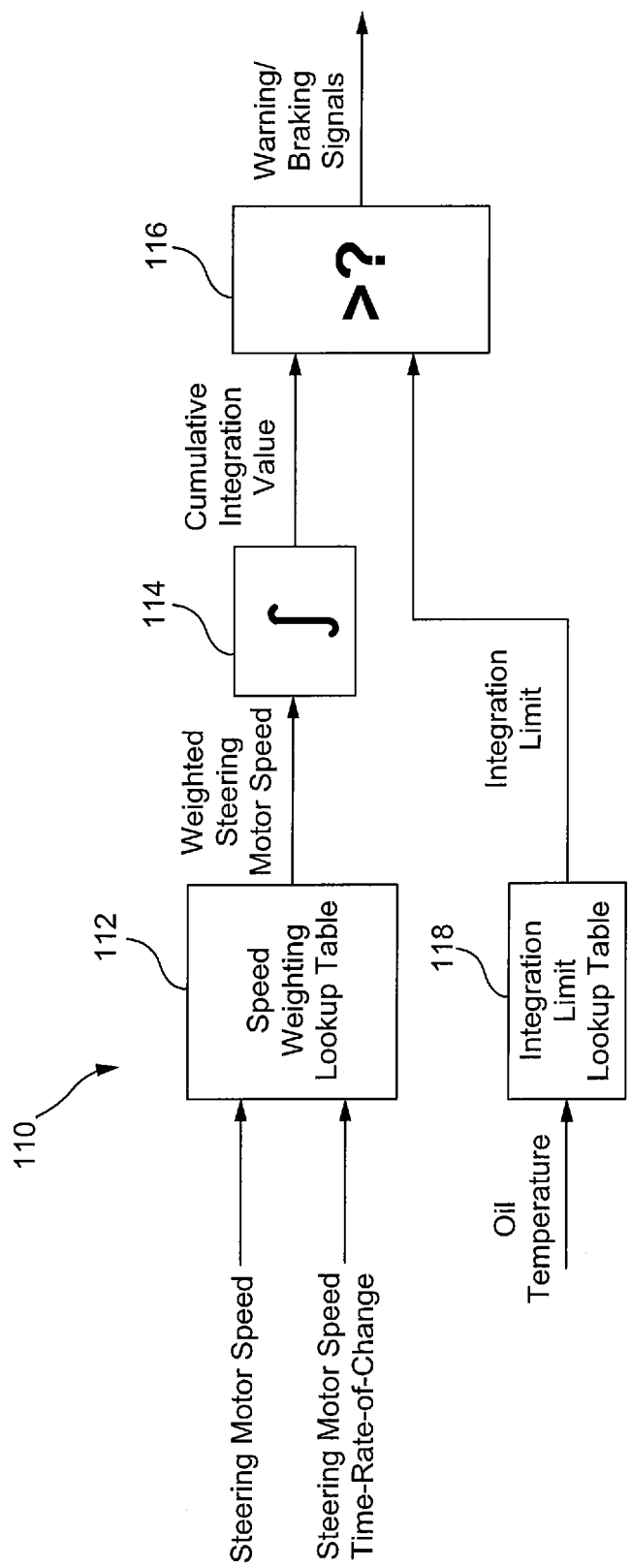
FIG. 7 is a schematic diagram of an uncommanded motion monitoring algorithm in accordance with the present disclosure of the track-type tractor of FIG. 1.

The steering motor speed signals may be interpreted by the control unit 24 to determine the actual speed of the steering motor 64 and, consequently, the actual turn direction of the tractor 10 for comparison to the turn direction commanded by the steering device 88 and output by the pump 62 to the steering motor 64. If the actual steering motor speed is equal to the commanded steering motor speed or indicates steering in the commanded direction, the tractor 10 is moving as desired without uncommanded motion. However, if the actual steering motor speed is not equal to the commanded steering motor speed, then uncommanded motion may be occurring and the tractor 10 may not be moving along the course desired by the operator. Uncommanded motion can occur where steering of the tractor 10 is occurring without steering commands (i.e. the turn direction signal is zero or neutral and the steering motor speed signals indicate differential rotation of the axle shafts 68, 72), where steering is commanded but the tractor 10 is turning in the opposite direction (i.e. the turn direction signal is not zero or neutral and the steering motor speed signals indicate that differential rotation is in the opposite direction as the commanded differential rotation), or where steering is commanded but the tractor 10 is moving straight (i.e. the turn direction signal is not zero or neutral and the steering motor speed signals indicate no differential rotation of the axle shafts 68, 72). The first two scenarios for uncommanded motion are particularly important due to high incidence of work area accidents, but any uncommanded motion can create safety issues.

Where uncommanded motion is detected, the amount and duration may be evaluated to determine whether the operator should be warned and the tractor 10 should be stopped. FIG. 7 illustrates a diagram of an uncommanded motion monitoring algorithm 110 that may determine when uncommanded motion requires corrective action. The algorithm 110 may be performed once the control unit 24 determines that the actual path of motion of the tractor 10 does not match the commanded path of motion, such as when the speed of the steering motor 64 does not match the speed commanded by the control unit 24 to the pump 62 based on the turn direction signal from the steering device 88.

Once the uncommanded motion is detected, the steering motor speed and, depending on the implementation, the time-rate-of-change of the steering motor speed may be input to a speed weighting lookup table 112 to determine a weighted steering motor speed. Steering motor speed may be an observed steering motor speed or a difference between the commanded steering motor speed and an observed steering motor speed, depending on the particular implementation. The speed weighting lookup table 112 may be a table stored in the memory 82 of the control unit 24, programmed into the software executing the algorithm 110, or otherwise implemented at the tractor 10.

The algorithm 110 may use the steering motor speed and the time-rate-of-change of the steering motor speed to determine the weighted steering motor speed. The steering motor speed may be used in the algorithm 110 to account for the rate or radius of turning of the tractor 10 and the additional time and distance required to stop the tractor 10, and corresponding faster response by the algorithm 110 in triggering corrective measures when uncommanded motion occurs. Consequently, the speed weighting lookup table 112 may be configured to produce a greater weighted steering motor speed output at higher steering motor speeds than at lower steering motor speeds for the same input steering motor speed. The time-rate-of-change of the steering motor speed may be calculated by the control unit 24 based on the steering motor speed signals transmitted from the sensor 92 over a plurality of sampling cycles, and may provide an indication that the uncommanded motion is increasing or decreasing as the tractor 10 continues to be propelled. Where the steering motor speed is increasing, the speed weighting lookup table 112 may be configured to produce a greater weighted steering motor speed output than when the steering motor speed is decreasing to be more responsive to a worsening uncommanded steering motion condition. The weighted steering motor speed may be expressed as a number with linear or angular velocity units, or may be a dimensionless scaled number having a value reflective of the magnitude of the uncommanded motion, such as a decimal representing a percentage of an uncommanded motion limit value used up by the measured uncommanded motion.

The weighted steering motor speed from the speed weighting lookup table 112 may be input to an integrator 114 that may accumulate the weighted steering motor speeds over a series of readings from the steering motor speed sensor 92 and the steering device 88. The algorithm 110 may be set to execute at a relevant sampling rate that is appropriate for the tractor 10, such as a 20 ms loop that provides 50 samples per second that may allow for the appropriate response over the range of operating speeds of the tractor 10. The sampling rate may also be taken into account in the speed weighting lookup table 112 so that warnings are triggered at the appropriate time. The weighted steering motor speed is added to a cumulative integration value at the integrator 114 for subsequent comparison to an integration limit The cumulative integration value may continue to be increased as long as the actual steering motor speed is not equal to the commanded steering motor speed. If the actual and commanded steering motor speeds are equal, uncommanded motion is no longer occurring and the cumulative integration value may be reset to zero so that the integration value can restart accumulation when uncommanded motion is again detected.

After adding the weighted steering motor speed to the cumulative integration value at the integrator 114, the cumulative integration value may be compared to an integration limit at a comparator 116. The integration limit may be a constant value that, when met by the cumulative integration value, may cause a warning to be communicated to the operator. Meeting the integration limit may also cause the brakes to be applied and may cause the transmission 54 to cease driving the tracks 14, 16. Other uncommanded motion response strategies may also be initiated in response to detection of uncommanded motion.

Additional factors may be relevant to determining the integration limit and controlling how quickly the tractor 10 responds to uncommanded motion. Internal and external factors can impact the response of the tractor 10 to uncommanded motion. For example, the temperature of the oil in the tractor 10 may provide an indication of the viscosity of the oil and its affect on the reaction of the systems of the tractor 10 and the responsiveness of the tractor 10 to steering commands. The oil temperature may have an inverse relationship to the oil viscosity such that the systems are less responsive and more forgiving in the cold. Where these and other variables affect the ability of the tractor 10 to react to uncommanded motion, the algorithm 110 may include integration limit lookup tables 118 for determining the integration limit for the current operating conditions.

In the illustrated embodiment, the oil temperature from the oil temperature sensor 78 may be transmitted to the control unit 24 (FIGS. 5 and 6) and input to the integration limit lookup tables 118, which may be stored in memory 82, programmed into the control software of the control unit 24, or otherwise implemented in the tractor 10. The integration limit may be output from the lookup tables 118 and compared to the cumulative integration value at the comparator 116. If the cumulative integration value exceeds the integration limit, corrective action may be initiated. If not, the control unit 24 may continue to monitor the commanded steering motor speed and actual steering motor speed to determine whether uncommanded motion is still present. Oil temperature is one example of a factor that may be considered in determining the integration limit Other conditions affecting the reaction of the tractor 10 may be factored into the configuration of the integration limit lookup table 118, such as the brake fluid pressure and the condition of the surface 28 over which the tractor 10 travels. Moreover, the lookup table 118 may be configured to received and evaluate information for multiple factors affecting the operation of the tractor 10. Other factors affecting the operation and responsiveness of the tractor 10 will be apparent to those skilled in the art and are contemplated by the inventors as having use in detecting and reacting to uncommanded motion in accordance with the present disclosure.

Figure 8:
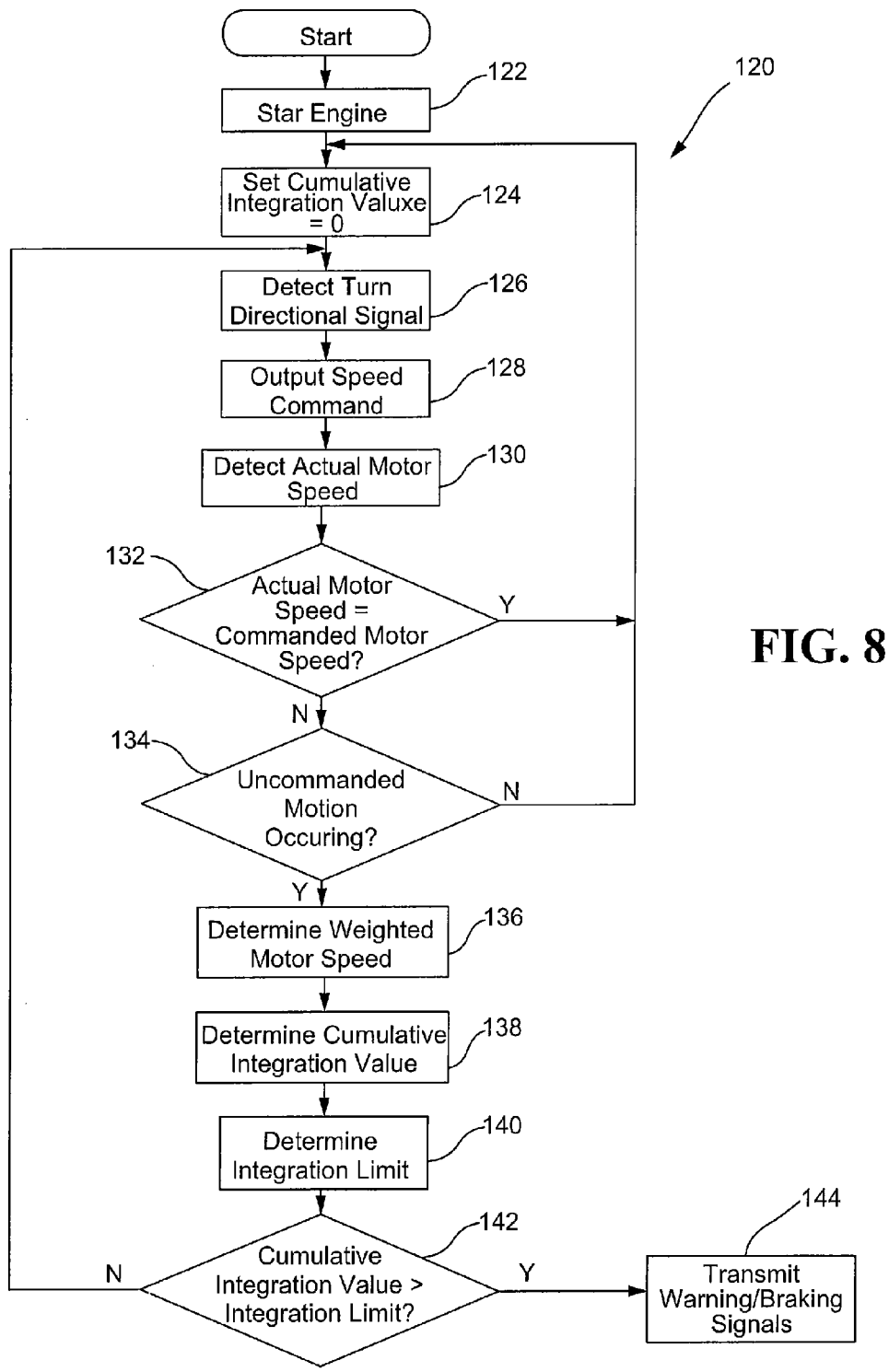
FIG. 8 is a block diagram of a steering motor control routine in accordance with the present disclosure implementing the uncommanded motion monitoring algorithm of FIG. 7 in the track-type tractor of FIG. 1.

The uncommanded motion monitoring algorithm 110 may be implemented at the control unit 24 within a steering motor control routine 120 as shown in FIG. 8. The routine 120 may begin at a block 122 where the engine 18 is started by the control unit 24 when the operator actuates a starter of the tractor 10 within the operator station 26. After the engine 18 is started, control may pass to a block 122 where the control unit 24 may initialize a cumulative integration value stored at the memory 82 by setting the value to zero and indicating that uncommanded motion of the tractor 10 has not been detected. With the engine 18 running, the operator may make additional preparations for operating the tractor 10, such as positioning the blade 20 and ripper 22 with respect to the surface 28, and engaging the transmission 54 with the engine 18, and then begin to propel the tractor 10 forward or backward.

With the tractor 10 moving, control may pass to a block 126 where the control unit 24 may detect turn direction signals from the steering device 88. Depending on the type of steering device 88, the device 88 may transmit a continuous control signal to the control unit 24 having a zero or neutral value when the tractor 10 should move in a straight path with both tracks 14, 16 moving at the same speed, or having a value indicating turns to the right or the left with a differential motion being created between the tracks 14, 16. The device 88 may alternatively transmit no signal when the device 88 is in a neutral position, and transmit a signal when the operator moves the steering device 88 from the neutral position to cause a turn to the left or to the right. Regardless of the type of steering device 88, the control unit 24 is configured to receive the signals from the steering device 88 and interpret the signals to determine a direction of the path commanded by the operator.

With the commanded path of the tractor 10 received from the steering device 88, control may pass to a block 128 where the control unit 24 may output speed command signals to the transmission 54 and/or the pump 62 to cause the transmission 54, pump 62 and steering motor 64 to respond and move the tractor 10 along the commanded path. If the turn direction signals indicate a straight path, the steering motor 64 will operate at a speed, or not operate, to cause the axle shafts 68, 72 to rotate at the same speed so there is no differential speed between the axle shafts 68, 72 and the tracks 14, 16. If the turn direction signals indicate that the tractor 10 should turn right or left, the steering motor 64 will operate at a speed that will cause differential motion between the axle shafts 68, 72 and between the tracks 14, 16 to affect the commanded turn at the commanded turn radius.

As the tractor 10 moves under the command of the operator, the tractor 10 may move along the commanded path, or may deviate from the commanded path due to uncommanded motion. Control of the routine 120 may pass to a block 130 where the control unit 24 may detect and determine the actual steering motor speed and, correspondingly, the actual path of travel of the tractor 10. In the embodiment of FIGS. 5 and 6, the speed of the steering motor 64 may be determined via steering motor speed signals provided by the steering motor speed sensor 92 wherein the speed signals will be indicative of the speed of the steering motor 64 and the differential speeds between the tracks 14, 16. Of course, other sensors may be used to determine the speed of the steering motor 64, such as track speed sensors, axle load or shaft speed sensors 76 on the axles 68, 72, and the like, providing output signals from which the control unit 24 may determine the actual speed of the steering motor 64.

After determining the actual steering motor speed at the block 130, control may pass to a block 132 where the control unit 24 may compare the actual steering motor speed to the commanded steering motor speed output by the control unit 24. If the control unit 24 determines that the actual steering motor speed matches the commanded steering motor speed, then uncommanded motion is not occurring and control may pass back to the block 124 to reinitialize the cumulative integration value to zero so that the accumulation can begin anew when uncommanded motion is detected. If the control unit 24 determines that the actual steering motor speed is not equal to the commanded steering motor speed, then uncommanded motion may be occurring and control may pass to a block 134 to determine if uncommanded motion is in fact occurring.

It may be acceptable for the actual steering motor speed to be different than the commanded steering motor speed as long as the tractor 10 turns in the commanded direction but at a larger or smaller turn radius than commanded. This type of steering motor speed difference may merely relate to a calibration error between the control unit 24 and the steering motor 64. If the actual and commanded steering motor speeds indicate turns in the same direction, uncommanded motion may not be present and control may pass back to the block 124 to reinitialize the cumulative integration value begin accumulation anew when uncommanded motion is detected. Uncommanded motion occurs if one steering motor speed indicates no turning or straight travel and the other steering motor speed indicates a turn in either direction, or if the steering motor speeds indicate turns in opposite directions. Where either of these conditions occurs, control may pass to a block 136 to determine a weighted steering motor speed.

The weighted steering motor speed may be determined by the control unit 24 as discussed above by inputting the steering motor speed and the time-rate-of-change of the steering motor speed, and using the speed weighting lookup table 112 to yield the weighted steering motor speed. The speed weighting lookup table 112 may be configured to output weighted steering motor speeds where the actual steering motor speed indicates no turning or a straight path, or turns to the left or right. For any input steering motor speed, the speed weighting lookup table 112 outputs a weighted steering motor speed that will increase the cumulative integration value when input to the integrator 114. As one example, a steering motor speed equal to zero may equate to no turning, a positive value may indicate turning to the right, and a negative value may indicate turning to the left. When a steering motor speed equal to zero is input, the table 112 may output a weighted steering motor speed having a positive non-zero value with a magnitude reflecting severity of not turning the tractor 10 when a turn is commanded. Inputting a steering motor speed with a positive value may cause the table 112 to output a weighted steering motor speed having a positive value that increases or decreases as the value of the steering motor speed increases or decreases. For steering motor speeds with a negative value, the table 112 may output a weighted steering motor speed equal to that of a positive steering motor speed of the same magnitude. As discussed above, where the time-rate-of-change of the steering motor speed is provided as an input to the speed weighting lookup table 112, the table 112 may be configured to output a larger weighted steering motor speed when the actual steering motor speed is increasing and the uncommanded motion is becoming more severe or problematic, and to output a smaller weighted steering motor speed where the actual steering motor speed is decreasing and the uncommanded motion may be abating. Those skilled in the art will understand that other implementations are possible where particular ranges of steering motor speeds correspond to left and right turns and straight line motion, and that the speed weighting lookup table 112 may be configured to output corresponding weighted steering motor speeds that will change the cumulative integration value at an appropriate rate for desired monitoring and control of uncommanded motion in the tractor 10.

Control may pass to a block 138 after the weighted steering motor speed is the determined so that the weighted steering motor speed may be added to the cumulative integration value. The weighted steering motor speed may be input to the integrator 114, and the integrator 114 in turn will increase the cumulative integration value by the weighted steering motor speed. The integration limit may be determined at a block 140. As discussed above, the integration limit may be a constant value, or may be determined by the control unit 24 at the integration limit lookup table 118 based on the current values of one or more operating variables or parameters of the tractor 10, such as the current oil temperature measured by the oil temperature sensor 78. After both values are determined at blocks 138, 140, the updated cumulative integration value may then be compared to the integration limit at a block 142. The updated cumulative integration value may be input to the comparator 116 along with the integration limit for the tractor 10.

If the cumulative integration value is less than the integration limit, the uncommanded motion has not had sufficient magnitude and duration for the algorithm 110 as implemented in the routine 120 to trigger a response strategy by the control unit 24 to warn the operator or stop the tractor 10. In other words, the uncommanded motion is still within the acceptable limits for the current operating conditions of the tractor 10. Because the cumulative uncommanded motion has not exceeded the acceptable limits, control may pass back to the block 126 to continue executing the turn direction signals provided by the operator via the steering device 88, comparing the actual path of motion of the tractor 10 to the commanded path of motion, and increasing the value representing the cumulative uncommanded motion if the actual path of motion is different than the commanded path of motion.

Alternatively, if the cumulative integration value is greater than or equal to the integration limit when compared at the block 142, then control may pass to a block 144 where the control unit 24 may initiate an uncommanded motion response strategy in recognition of the magnitude and duration of the uncommanded motion exceeding the acceptable limits In one implementation, the response strategy may include providing warnings or alarms for the operator while allowing the tractor 10 to continue operating with uncommanded motion. The warnings may include causing the control unit 24 to illuminate a warning lamp (not shown) in the operator station 26, to output an auditory alarm message or siren from a speaker (not shown), to output a visual alarm message at a display device (not shown) in the operator station, or otherwise notify the operator. Where operation of the tractor 10 continues, control may pass back to the block 126 from the block 140 to continue monitoring the motion of the tractor 10. If the uncommanded motion continues, the alarms and warnings may continue. If the uncommanded motion ceases, the control unit 24 may stop the outputting of the alarm and warning messages when the cumulative integration value is reset to zero. In other implementations, the response strategy may include disengaging the transmission 54, applying brakes (not shown) of the tractor 10, or otherwise stopping the tractor 10 in addition to outputting warning messages and/or alarms notifying the operator of the reason for automatically stopping the tractor 10. With the tractor 10 stopped, the operator, technician, maintenance worker or the like can assess the status of the tractor 10 and determine the cause of the uncommanded motion.

Industrial Applicability

The uncommanded motion monitoring algorithm 110 as implemented in the steering motor control routine 120 addresses issues existing in previous systems relating to the sensitivity of prior systems to triggering at low speeds and high speeds, and to responding to variable conditions affecting a vehicle's responsiveness to operator commands and ability to react to uncommanded motion. The algorithm 110 replaces the time element for triggering responses to uncommanded motion with a weighting of the magnitude of the uncommanded motion based on the steering motor speed and, in some implementations, the time-rate-of-change of the steering motor speed. For the same magnitude of steering motor speed, the vehicle will react sooner to the uncommanded motion at faster steering motor speeds wherein the operator has less time and distance to react than at slower steering motor speeds. Previously, the vehicles reacted after the same prescribed time period regardless of the measured steering motor speed or the rate at which the steering motor speed was changing.

With the algorithm 110 in accordance with the present disclosure, the weighted steering motor speed provided to the integrator 114 is greater when the measured value and rate of change of the steering motor speed indicates that the detected uncommanded motion problem is more severe so that the cumulative integration value increases at a faster rate. The cumulative integration value approaches the integration limit sooner so that a response to the uncommanded motion is triggered earlier to allow the vehicle and operator to react before an accident occurs. Conversely, the algorithm 110 will trigger a response slower when the uncommanded motion problem is less severe. The weighted steering motor speed will generally be lower when the steering motor speed is slower than at higher steering motor speeds. As a result, the uncommanded motion response will be triggered later at slower steering motor speeds where the speed of reacting to the uncommanded motion is less critical.

The algorithm 110 also adjusts the integration limit and, correspondingly, the speed with which the vehicle reacts to uncommanded motion, based on the vehicle's responsiveness to operator commands and ability to respond to the uncommanded motion. Vehicles react differently based on internal factors and external conditions affecting the performance of the vehicles. At times, a vehicle may respond more quickly or more slowly than the nominal performance for which the vehicle is designed. For example, the oil temperature affects the oil's viscosity, which affects the vehicles reaction to commands issued by the operator and control unit 24, such as to turn the tractor 10 and to stop in event of uncommanded motion. The oil may be more viscous at startup or in low temperature operating environments, and the corresponding vehicle systems using the oil may be less responsive. The lookup table 118 may be configured to account for the vehicle's ability to react and provide increased integration limits when the oil temperature sensors 78 indicate that the oil has a relatively low temperature.

At higher temperatures, such as after the engine 18 is running and transferring heat to the oil, or the vehicle is operating in a high temperature environment, the oil's viscosity may be reduced and the reactions of the systems of the vehicle speed up. This relationship between the oil temperature and the performance of the vehicle may be factored into the integration limit lookup table 118 so that the integration limit decreases as the oil temperature rises. Other factors may also influence the performance of the vehicle and may be taken into account in the integration limit lookup table 118. For example, the air pressure or brake fluid pressure may affect the reaction of the brakes of the vehicle when braking commands are issued by the control unit 24. The brakes may react slower so that the vehicle requires a longer stopping distance as the air or brake fluid pressure decreases. The lookup table 118 may be configured to receive signals from a pressure sensor of the brake system, and to output an integration limit that reflects the brake pressure and the vehicle's ability to stop. Lower pressure in the brake system may result in a lower integration limit for earlier triggering of the uncommanded motion response, and higher pressure may result in outputting increased integration limits for triggering the response where the brakes will be more responsive to braking commands from the control unit 24. Other internal and external factors affecting a vehicle's ability to respond to uncommanded motion will be apparent to those skilled in the art, and the use of such factors in the detection and response to uncommanded motion in vehicles is contemplated by the inventors as having use in algorithms 110 and routines 120 in accordance with the present disclosure.

It will be apparent to those skilled in the art that various modifications and variations can be made in the disclosed system and method without departing from the scope or spirit of the invention. Other embodiments of the invention will be apparent to those skilled in the art from consideration of the specification and practice of the invention disclosed herein. It is intended that the specification and examples be considered as exemplary only.

What is claimed is:

1. A differential steering control system for a machine where differential motion is created to steer the machine, the system comprising:
    a transmission for moving the machine in a forwards or a backwards direction;
    a steering motor for steering the machine in a leftwards or a rightwards direction;
    a steering device for providing turn direction signals indicating a desired direction of motion to cause the machine to move on a commanded path of motion; and
    a control unit operatively connected to the transmission, the steering motor, and the steering device,
        the control unit being programmed to receive the turn direction signals from the steering device and to output steering motor speed command signals to cause the steering motor to operate at a commanded steering motor speed to move the machine along the commanded path of motion,
        the control unit being programmed to determine an actual steering motor speed of the steering motor,
        the control unit being programmed to compare the actual steering motor speed to the commanded steering motor speed,
        the control unit being programmed to determine a weighted steering motor speed in response to determining that the actual steering motor speed is not equal to the commanded steering motor speed, wherein the weighted steering motor speed is based on the actual steering motor speed,
        the control unit being programmed to add the weighted steering motor speed to a cumulative integration value, the cumulative integration value being increased so long as the actual steering motor speed is not equal to the commanded steering motor speed,
        the control unit being programmed to compare the cumulative integration value to an integration limit for uncommanded motion of the machine, and
        the control unit being programmed to execute an uncommanded motion response strategy in response to determining that the cumulative integration value is greater than the integration limit.

2. The differential steering control system of claim 1, wherein the system comprises a steering motor speed sensor operatively connected to the steering motor to sense the actual steering motor speed, and operatively connected to the control unit to transmit a steering motor speed signal to the control unit, and wherein the control unit is programmed to receive the steering motor speed signal and to determine the actual steering motor speed based on the steering motor speed signal.

3. The differential steering control system of claim 1, wherein the control unit is programmed to determine the weighted steering motor speed by inputting the actual steering motor speed to a speed weighting lookup table, and outputting the weighted steering motor speed from the speed weighting lookup table.

4. The differential steering control system of claim 3, wherein the control unit is programmed to determine the weighted steering motor speed by inputting a time-rate-of-change of the actual steering motor speed to the speed weighting lookup table.

5. The differential steering control system of claim 1, wherein the weighted steering motor speed increases when the actual steering motor speed increases.

6. The differential steering control system of claim 1, wherein the control unit is programmed to set the cumulative integration value equal to zero in response to determining that the actual steering motor speed is equal to the commanded steering motor speed.

7. The differential steering control system of claim 1, wherein the control unit is programmed to repeat the steps for determining whether the actual steering motor speed is equal to the commanded steering motor speed in response to determining that the cumulative integration value is less than the integration limit.

8. A method for detecting and responding to uncommanded motion in a machine where differential motion is created to steer the machine, the method comprising:
generating, at a control unit, a command signal of the machine to move the machine along a commanded path of motion;
determining, at the control unit, an actual path of motion of the machine;
comparing, at the control unit, the actual path of motion to the commanded path of motion;
determining, at the control unit, a weighted steering motor speed of the machine in response to determining that the actual path of motion is not equal to the commanded path of motion, wherein the weighted steering motor speed is based on an actual steering motor speed of a steering motor of the machine;
adding, at the control unit, the weighted steering motor speed to a cumulative integration value for uncommanded motion, the cumulative integration value being increased so long as the actual steering motor speed is not equal to a commanded steering motor speed;
comparing, at the control unit, the cumulative integration value to an integration limit for uncommanded motion of the machine; and
executing, at the control unit, an uncommanded motion response strategy in response to determining that the cumulative integration value is greater than the integration limit.

9. The method of claim 8, wherein determining the actual path of motion comprises measuring the actual steering motor speed.

10. The method of claim 8, wherein commanding the machine comprises:
receiving turn direction signals from a steering device of the machine at the control unit of the machine;
outputting steering motor speed command signals from the control unit to the steering motor of the machine to move the machine along the commanded path of motion, wherein the steering motor speed command signals correspond to the turn direction signals.

11. The method of claim 10, wherein determining the actual path of motion comprises determining the actual steering motor speed, and wherein comparing the actual path of motion to the commanded path of motion comprises comparing the actual steering motor speed to the commanded steering motor speed.

12. The method of claim 8, wherein determining the weighted steering motor speed comprises:
inputting the actual steering motor speed, to a speed weighting lookup table; and
outputting the weighted steering motor speed from the speed weighting lookup table.

13. The method of claim 12, wherein determining the weighted steering motor speed comprises inputting a time-rate-of-change of the actual steering motor speed to the speed weighting lookup table.

14. The method of claim 8, wherein the weighted steering motor speed increases when the actual steering motor speed increases.

15. The method of claim 8, comprising setting the cumulative integration value equal to zero in response to determining that the actual steering motor speed is equal to the commanded steering motor speed.

16. The method of claim 8, comprising repeating the steps of the method in response to determining that the cumulative integration value is less than the integration limit.

17. A differential steering control system for a machine where differential motion is created to steer the machine, the system comprising:
a transmission for moving the machine in a forwards or a backwards direction;
a steering motor for steering the machine in a leftwards or a rightwards direction;
a steering device for providing turn direction signals indicating a desired direction of motion to cause the machine to move on a commanded path of motion; and
a control unit operatively connected to the transmission, the steering motor, and the steering device,
the control unit being programmed to receive the turn direction signals from the steering device and to output steering motor speed command signals to cause the steering motor to operate at a commanded steering motor speed to move the machine along the commanded path of motion,
the control unit being programmed to determine an actual steering motor speed,
the control unit being programmed to compare the actual steering motor speed to the commanded steering motor speed,
the control unit being programmed to determine a cumulative integration value in response to determining that the actual steering motor speed is not equal to the commanded steering motor speed, wherein the cumulative integration value is based on the actual steering motor speed and modified for each determination that the actual steering motor speed is not equal to the commanded steering motor speed,
the control unit being programmed to determine an integration limit for weighted steering motor speed based on a value of a parameter indicative of an ability of the machine to produce the commanded motion,
the control unit being programmed to compare the cumulative integration value to the integration limit, and the control unit being programmed to execute an uncommanded motion response strategy in response to determining that the cumulative integration value is greater than the integration limit.

18. The differential steering control system of claim 17, comprising a parameter sensor for determining a value of the parameter operatively connected to the control unit, wherein the control unit is programmed to receive the value of the parameter from the parameter sensor, to input the value of the parameter to an integration limit lookup table, and to output the integration limit from the integration limit lookup table.

19. A method for detecting and responding to uncommanded motion in a machine where differential motion is created to steer the machine, the method comprising:
- commanding, at a control unit, the machine to move along a commanded path of motion;
- determining, at the control unit, an actual path of motion of the machine;
- comparing, at the control unit, the actual path of motion to the commanded path of motion;
- determining, at the control unit, a cumulative integration value for uncommanded motion in response to determining that the actual path of motion is not equal to the commanded path of motion, wherein the cumulative integration value is based on a difference between an actual steering motor speed of a steering motor of the machine and a commanded steering motor speed, and modified for each determination that the actual path of motion is not equal to the commanded path of motion;
- determining, at the control unit, an integration limit for uncommanded motion of the machine, wherein the integration limit is based on a value of a parameter indicative of an ability of the machine to respond to uncommanded motion;
- comparing, at the control unit, the cumulative integration value to the integration limit; and
- executing, at the control unit, an uncommanded motion response strategy in response to determining that the cumulative integration value is greater than the integration limit.

20. The method of claim 19, wherein determining the integration limit comprises:
- inputting the value of the parameter to an integration limit lookup table; and
- outputting the integration limit from the integration limit lookup table.

* * * * *